United States Patent
Kishigami et al.

(10) Patent No.: US 10,509,103 B2
(45) Date of Patent: Dec. 17, 2019

(54) RADAR DEVICE

(71) Applicant: Panasonic Intellectual Property Management Co., Ltd., Osaka (JP)

(72) Inventors: Takaaki Kishigami, Tokyo (JP); Tadashi Morita, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/206,462

(22) Filed: Nov. 30, 2018

(65) Prior Publication Data

US 2019/0101617 A1 Apr. 4, 2019

Related U.S. Application Data

(63) Continuation of application No. 15/004,863, filed on Jan. 22, 2016, now abandoned.

(30) Foreign Application Priority Data

Feb. 16, 2015 (JP) .................................. 2015-027526

(51) Int. Cl.
*G01S 7/02* (2006.01)
*G01S 7/292* (2006.01)
(Continued)

(52) U.S. Cl.
CPC ............ *G01S 7/023* (2013.01); *G01S 7/021* (2013.01); *G01S 7/292* (2013.01); *G01S 7/36* (2013.01);
(Continued)

(58) Field of Classification Search
CPC .......... G01S 7/023; G01S 7/021; G01S 7/292; G01S 7/36; G01S 13/931; G01S 2013/0245
(Continued)

(56) References Cited

U.S. PATENT DOCUMENTS 5,173,880 A * 12/1992 Duren .................. G01V 1/282
367/21
6,297,764 B1 * 10/2001 Wormington ......... G01S 7/2921
342/101

(Continued)

FOREIGN PATENT DOCUMENTS

EP    2 613 174 A1    7/2013
EP    2613174 A1 *   7/2013 ............. G01S 7/282
(Continued)

OTHER PUBLICATIONS

"Ed. by the Society of Instrument and Control Engineers", Handbook on Automatic Control, Volume on Equipment/ Applications, Japan, Ohmsha, Ltd., published on Oct. 30, 1983, p. 188-190, with English translation, total 10 pages.

(Continued)

*Primary Examiner* — Vladimir Magloire
*Assistant Examiner* — Nuzhat Pervin
(74) *Attorney, Agent, or Firm* — Seed IP Law Group LLP

(57) ABSTRACT

A radar device employs a configuration provided with: a receiver which, in operation, receives one or more radar transmission signals transmitted from another radar device, in an interference measurement segment in which transmission of a radar transmission signal from the radar device is stopped; A/D conversion circuitry which, in operation, converts the one or more radar transmission signals from the other radar device received by the receiver from one or more analog signals into one or more digital signals; and an interference detection circuitry which, in operation, performs a correlation calculation between each of one or more discrete samples that is the one or more digital signals and a prescribed coefficient sequence to detect one or more prescribed frequency components included in the one or (Continued)

more digital signals, as one or more interference signal components.

8 Claims, 12 Drawing Sheets

(51) Int. Cl.
  *G01S 7/36* (2006.01)
  *G01S 13/93* (2006.01)
  *G01S 13/02* (2006.01)
(52) U.S. Cl.
  CPC ..... *G01S 13/931* (2013.01); *G01S 2013/0245* (2013.01)
(58) Field of Classification Search
  USPC .......................................................... 342/16
  See application file for complete search history.

(56) References Cited

U.S. PATENT DOCUMENTS

| | | | | |
|---|---|---|---|---|
| 6,744,808 | B1* | 6/2004 | Walley | H04B 1/707 375/140 |
| 8,306,003 | B2* | 11/2012 | Ramesh | H04W 74/0866 370/338 |
| 8,526,824 | B1* | 9/2013 | Turner | G01M 11/3145 398/158 |
| 2003/0156061 | A1* | 8/2003 | Ohira | H01Q 3/22 342/372 |
| 2006/0159207 | A1* | 7/2006 | Wagner | H03D 7/163 375/344 |
| 2006/0181448 | A1* | 8/2006 | Natsume | G01S 7/36 342/70 |
| 2011/0063164 | A1 | 3/2011 | Mizutani et al. | |
| 2013/0127655 | A1* | 5/2013 | Kishigami | G01S 7/288 342/152 |
| 2013/0135140 | A1* | 5/2013 | Kishigami | G01S 7/282 342/189 |
| 2013/0176166 | A1* | 7/2013 | Kishigami | G01S 7/023 342/202 |
| 2013/0202287 | A1* | 8/2013 | Joffe | G01M 11/3118 398/13 |
| 2013/0257643 | A1* | 10/2013 | Inomata | G01S 13/931 342/70 |
| 2015/0091872 | A1* | 4/2015 | Worfolk | G06F 3/0416 345/175 |
| 2015/0204971 | A1* | 7/2015 | Yoshimura | G01S 13/345 342/70 |
| 2016/0235301 | A1* | 8/2016 | Melodia | G08C 23/02 |

FOREIGN PATENT DOCUMENTS

| | | |
|---|---|---|
| JP | 49-37590 A | 4/1974 |
| JP | 2005-55302 A | 3/2005 |
| JP | 2006-220624 A | 8/2006 |
| JP | 2010-181182 A | 8/2010 |
| JP | 2011-59016 A | 3/2011 |
| JP | 2013-238477 A | 11/2013 |
| WO | 2012/029242 A1 | 3/2012 |
| WO | WO-2012029242 A1 * | 3/2012 ............ G01S 7/282 |
| WO | 2012/046419 A1 | 4/2012 |
| WO | WO-2012046419 A1 * | 4/2012 ............ G01S 7/023 |
| WO | 2012/066737 A1 | 5/2012 |
| WO | WO-2012066737 A1 * | 5/2012 ............ G01S 7/023 |
| WO | 2012/164898 A1 | 12/2012 |
| WO | WO-2012164898 A1 * | 12/2012 ........... G01S 13/288 |

OTHER PUBLICATIONS

S.Z. Budisin "New complementary pairs of sequences" Electronics Letters, Jun. 1990, vol. 26, No. 13, pp. 881-883.

* cited by examiner

RADAR DEVICE

BACKGROUND

Technical Field

The present disclosure relates to a radar device that detects interference.

Description of the Related Art

In recent years, high-resolution radar that uses microwaves, milliwaves, and the like has been studied. Furthermore, the development of wide-angle radar that detects not only vehicles but also pedestrians is needed to improve safety outdoors.

In wide-angle pulse radar that detects vehicles and pedestrians, a plurality of reflected waves from near-distance targets (for example, vehicles) and far-distance targets (for example, people) are mixed within reception signals, and therefore radar transmission units are required to have a transmission configuration that transmits pulse waves or pulse modulated waves having low range sidelobe characteristics. Furthermore, radar reception units are required to have a reception configuration that has a broad reception dynamic range.

Proposals have been made for pulse compression radar that uses Barker codes, M-sequence codes, and complementary codes as pulse waves or pulse modulated waves for obtaining low range sidelobe characteristics. In particular, a method for generating complementary codes is disclosed in 'New Complementary Pairs of Sequences,' Budisin S. Z., Electron. Lett., 1990, 26, (13), pp. 881-883.

Complementary codes can be generated as follows, for example. To be specific, complementary codes having a code length of $L=4, 8, 16, 32, \ldots, 2^P$ can be sequentially generated on the basis of code sequences of $a=[1\ 1]$ and $b=[1\ -1]$ that are complementary and are made up of the elements 1 or −1. Although the required reception dynamic range increases as the code length increases, with complementary codes, the peak sidelobe ratio (PSR) can be reduced with a shorter code length. Therefore, the dynamic range required for reception can be reduced even in the case where a plurality of reflected waves from near-distance targets and far-distance targets are mixed. However, in the case where M-sequence codes are used, the PSR is given at $20 \log(1/L)$, and in order to obtain a low range sidelobe, a code length L that is longer than that of a complementary code becomes necessary (for example, $L=1024$ in the case where PSR=60 dB).

In the case where the frequency bands of radio waves output by a plurality of radar devices are the same band or some of the bands overlap, interference among the radar devices occurs when a positional relationship develops in which the detection areas of the plurality of radar devices overlap. In other words, a relationship develops in which the radio waves output by a certain radar device are received by another radar device. Interference between the radar devices become strong interference as the positional relationship between the radar devices becomes closer (in other words, as the distance therebetween decreases), the non-detection rate or the erroneous detection rate increases for targets that should originally be detected, and deterioration in detection performance increases.

Therefore, a technique that prevents deterioration in detection performance caused by interference between radar devices, by detecting interference components from another radar device is disclosed in Japanese Unexamined Patent Application Publication No. 2006-220624, for example.

Japanese Unexamined Patent Application Publication No. 2006-220624 discloses a device that determines interference from another radar device mounted in a vehicle. With vehicle-mounted radar, the detection area changes as the vehicle travels. In the case where the frequency bands of output radio waves are the same or some of the bands overlap between vehicle-mounted radar devices mounted in a plurality of vehicles, interference occurs when a positional relationship develops in which the detection areas overlap.

With regard to this kind of interference, Japanese Unexamined Patent Application Publication No. 2006-220624 discloses a configuration that is a reception configuration for a frequency modulated continuous wave (hereinafter referred to as FMCW) radar device and detects interference from another FMCW radar device. An FMCW radar device uses frequency spectrum data of obtained beat signals to obtain an integral strength value in a prescribed frequency range, and determines that interference with another radar device has occurred in the case where the integral strength value exceeds an interference determination threshold value.

BRIEF SUMMARY

In the aforementioned FMCW radar device disclosed in Japanese Unexamined Patent Application Publication No. 2006-220624, reflected waves of radio waves output by the radar device are also included in the calculated strength integral value, and the amount thereof depends upon the situation such as the surrounding structures or the road surface. Therefore, in order to suppress erroneous interference determinations, it is necessary to set a determination threshold value to be sufficiently high, and there is a possibility of there being a decrease in interference detection sensitivity.

One non-limiting and exemplary embodiment provides a radar device that improves detection sensitivity for interference from another radar device.

In one general aspect, the techniques disclosed here feature: a radar device provided with: a receiver which, in operation, receives one or more radar transmission signals transmitted from another radar device, in an interference measurement segment in which transmission of one or more radar transmission signals from the radar device is stopped; an A/D converting circuitry which, in operation, converts the one or more radar transmission signals from the other radar device received by the receiver from one or more analog signals into one or more digital signals; and an interference detecting circuitry which, in operation, performs a correlation calculation between each of the one or more discrete samples that are the one or more digital signals and a prescribed coefficient sequence to detect one or more prescribed frequency components included in the one or more digital signals, as one or more interference signal components.

It should be noted that general or specific embodiments may be implemented as a system, a method, an integrated circuit, a computer program, a storage medium, or any selective combination thereof.

According to the present disclosure, it is possible to improve detection sensitivity for interference from another radar device.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereafter, embodiments of the present disclosure will be described in detail with reference to the drawings. However, in the embodiments, configurations having the same function are denoted by the same reference numbers and redundant descriptions are omitted.

Embodiment 1

Figure 1:
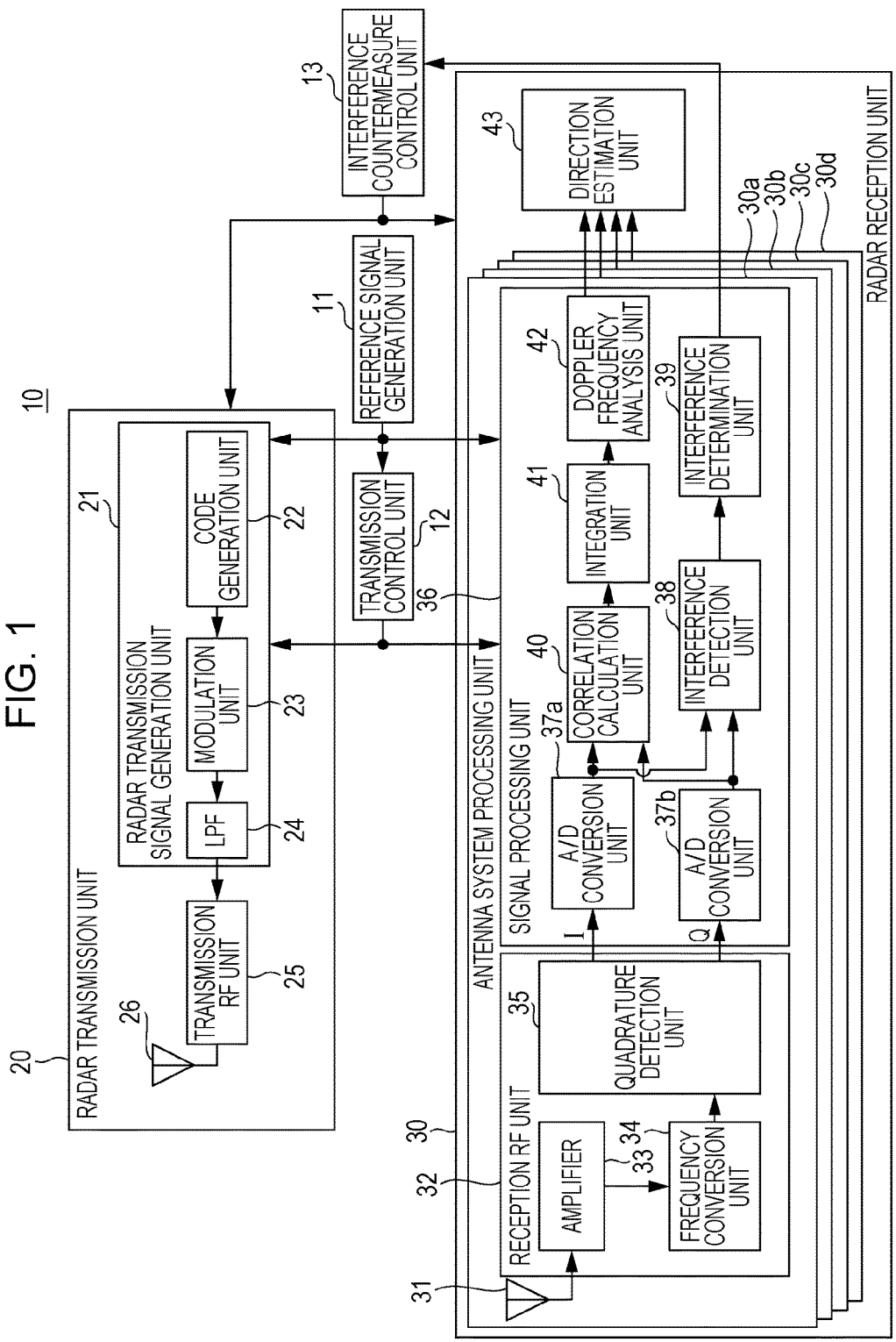
FIG. 1 is a block diagram depicting the configuration of a radar device according to embodiment 1 of the present disclosure.

FIG. 1 is a block diagram depicting the configuration of a radar device 10 according to embodiment 1 of the present disclosure. The radar device 10 is provided with a radar transmission unit 20, a radar reception unit 30, a reference signal generation unit 11, a transmission control unit 12, and an interference countermeasure control unit 13.

First, the configuration of the radar transmission unit 20 will be described.

The radar transmission unit 20 is provided with a radar transmission signal generation unit 21, a transmission RF unit 25, and a transmission antenna 26. The radar transmission signal generation unit 21 is provided with a code generation unit 22, a modulation unit 23, and a band control filter (denoted as "LPF" (low pass filter) in the drawing and hereinafter referred to as "LPF") 24. Furthermore, the radar transmission signal generation unit 21 generates a timing clock produced by multiplying a reference signal from the reference signal generation unit 11 by a prescribed number, and on the basis thereof, repeatedly outputs a baseband radar transmission signal $r(n, M)=I(n, M)+jQ(n, M)$ in a prescribed radar transmission period Tr. It should be noted that j represents an imaginary unit, n represents a discrete timepoint, and M represents an ordinal number for a radar transmission period.

The code generation unit 22 generates codes $a_n$ that constitute a code sequence (an M-sequence code, a Barker code sequence, a complementary code sequence, or the like) of the code length L, and outputs to the modulation unit 23. It should be noted that $n=1, \ldots, L$. The codes $a_n$ are generated in each radar transmission period Tr.

In the case where the code sequence is a complementary code sequence (including a Golay code sequence, a Spano code sequence, or the like), codes $P_n$ and $Q_n$ that constitute a pair are each generated alternately in each radar transmission period. In other words, a code $P_n$ is transmitted as a pulse compression code $a_n$ in an $M^{th}$ radar transmission period Tr, and then a code $Q_n$ is transmitted as a pulse compression code $b_n$ in an $M+1^{th}$ radar transmission period Tr. In the radar transmission periods thereafter ($M+2^{th} \ldots$), transmission is repeatedly performed in the same way with $M^{th}$ to $M+1^{th}$ radar transmissions serving as single units.

A complementary code is made up of two code sequences (hereinafter taken as pulse compression codes $a_n$ and $b_n$; furthermore, $n=1, \ldots L$, and L is the code sequence length). Autocorrelation calculations for each of the pulse compression codes $a_n$ and $b_n$ are given in the following expressions (1) and (2). When the results thereof are added with the shift times $\tau$ thereof being consistent (see the following expression (3)), a correlation value is reached with which the range sidelobe is 0. Complementary codes have the aforementioned properties.

[Equation 1]

$$R_{aa}(\tau) = \sum_{n=1}^{L} a_n a_{n+\tau}^* \quad (1)$$

[Equation 2]

$$R_{bb}(\tau) = \sum_{n=1}^{L} b_n b_{n+\tau}^* \quad (2)$$

Here, $a_n = 0$ and $b_n = 0$ in $n > L$ and $n < 1$.

[Equation 3]

$$\begin{cases} R_{aa}(\tau) + R_{bb}(\tau) \neq 0, \text{ when } \tau = 0 \\ R_{aa}(\tau) + R_{bb}(\tau) = 0, \text{ when } \tau \neq 0 \end{cases} \quad (3)$$

The modulation unit 23 performs pulse modulation (amplitude modulation, ASK, pulse shift keying) or phase modulation (PSK) with respect to the code sequence output from the code generation unit 22, and outputs to the LPF 24.

The LPF 24 outputs the modulated signal output from the modulation unit 23, to the transmission RF unit 25 as a radar transmission signal of a baseband limited to within a prescribed band.

The transmission RF unit 25 converts the baseband radar transmission signal output from the radar transmission signal generation unit 21 into a carrier frequency (radio frequency: RF) band by frequency conversion. Furthermore, the transmission RF unit 25 amplifies the carrier frequency-band radar transmission signal to a prescribed transmission power P [dB] with a transmission amplifier and outputs to the transmission antenna 26.

The transmission antenna 26 radiates the radar transmission signal output from the transmission RF unit 25 into a space.

Figure 2:
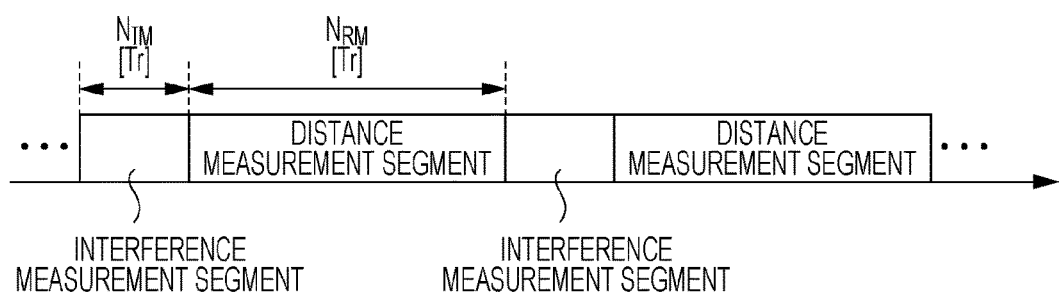
FIG. 2 is a drawing depicting the way in which switching is performed between an interference measurement segment and a distance measurement segment.

The transmission control unit 12 performs transmission control that differs in accordance with two operation segments depicted in FIG. 2, in other words, an interference measurement segment in which a radar transmission signal transmitted from another radar device is measured, and a distance measurement segment in which the distance to a target is measured.

Figure 3:
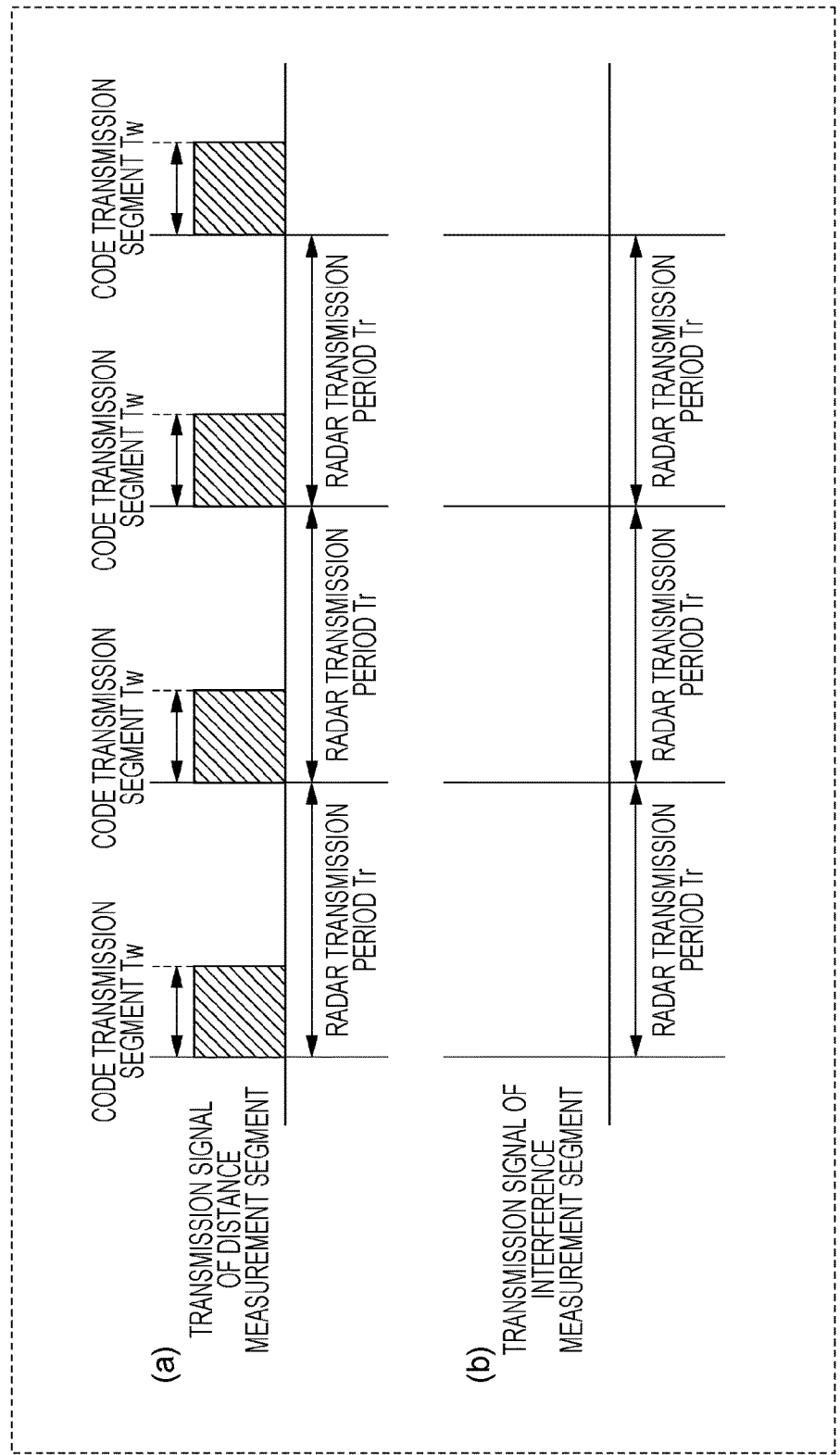
FIG. 3 includes a drawing depicting radar transmission signals of distance measurement segments, and a drawing depicting radar transmission signals of interference measurement segments.

FIG. 3 includes a drawing depicting radar transmission signals of distance measurement segments, and a drawing depicting radar transmission signals of interference measurement segments. FIG. 3(a) depicts radar transmission signals of distance measurement segments. A radar transmission signal is present in a code transmission segment Tw of each radar transmission period Tr, and the segments (Tr-Tw) that remain are non-signal segments. Furthermore, a pulse code sequence of the pulse code length L is included within the code transmission segments Tw; however, by carrying out modulation that uses a No sample for each single pulse code, an Nr=No×L sample signal is included within each code transmission segment Tw. Furthermore, an Nu sample is included in the non-signal segments (Tr-Tw) in the radar transmission periods. On the other hand, FIG. 3(b) depicts radar transmission signals of interference measurement segments. As depicted in FIG. 3(b), in the interference measurement segments, the transmission of radar transmission signals from the radar device 10 is stopped and a state in which codes are not transmitted is entered for a prescribed number of radar transmission periods.

Furthermore, the transmission control unit 12 performs transmission control in which interference measurement segments serve as $N_{IM}$ number of code transmission periods, distance measurement segments serve as $N_{RM}$ number of code transmission periods, and switching is performed therebetween.

Next, the configuration of the radar reception unit 30 will be described.

The radar reception unit 30 is mainly provided with antenna system processing units 30a to 30d that correspond to the number of reception antennas that make up an array antenna, and a direction estimation unit 43. The antenna system processing units 30a to 30d are each provided with a reception antenna 31, a reception RF unit 32, and a signal processing unit 36.

The reception antenna 31 receives a signal produced by a radar transmission signal transmitted from the radar transmission unit 20 being reflected by a reflecting object including the target. A radar reception signal received by the reception antenna 31 is output to the reception RF unit 32.

The reception RF unit 32 is provided with an amplifier 33, a frequency conversion unit 34, and a quadrature detection unit 35.

The amplifier 33 performs signal amplification with respect to the radar reception signal received by the reception antenna 31, and outputs to the frequency conversion unit 34.

The frequency conversion unit 34 converts the radio-frequency radar reception signal output from the amplifier 33 into a low-frequency radar reception signal, and outputs to the quadrature detection unit 35.

The quadrature detection unit 35 performs quadrature detection with respect to the low-frequency radar reception signal output from the frequency conversion unit 34, and performs conversion into baseband signals made up of an I signal and a Q signal. The I signal is output to an A/D conversion unit 37a of the signal processing unit 36, and the Q signal is output to an A/D conversion unit 37b of the signal processing unit 36. It should be noted that a timing clock signal of the signal processing unit 36 for the baseband signals is generated as a timing clock of a prescribed multiple using a reference signal from the reference signal generation unit 11 in the same way as with the radar transmission signal generation unit 21.

The signal processing unit 36 is provided with the A/D conversion units 37a and 37b, a correlation calculation unit 40, an integration unit 41, a Doppler frequency analysis unit 42, an interference detection unit 38, and an interference determination unit 39.

The A/D conversion units 37a and 37b perform sampling at discrete times with respect to the baseband signals made up of the I signals and the Q signals output from the quadrature detection unit 35, and perform conversion into digital data. The A/D conversion units 37a and 37b output the converted digital data to the correlation calculation unit 40 and the interference detection unit 38. Here, for the sampling rate of the A/D conversion units 37a and 37b, Ns number of discrete samples are performed at each one pulse time Tp (=Tw/L) in the radar transmission signal, in other words, Ns number of over-samples per one pulse. It should be noted that, hereinafter, baseband signals Ir(k, M) and Qr(k, M) made up of I signals and Q signals of a discrete timepoint k in an $M^{th}$ radar transmission period are indicated using a complex number x(k, M)=Ir(k, M)+jQr(k, M). Furthermore, j is an imaginary unit. Moreover, hereinafter, with regard to the timepoints k, measurement up to k=(Nr+Nu)Ns/No, which is a sample point up to prior to a radar transmission period Tr ending, is periodically performed with the timing at which the radar transmission period Tr starts serving as a reference (k=1). In other words, k=1, . . . , (Nr+Nu)Ns/No.

Figure 4:
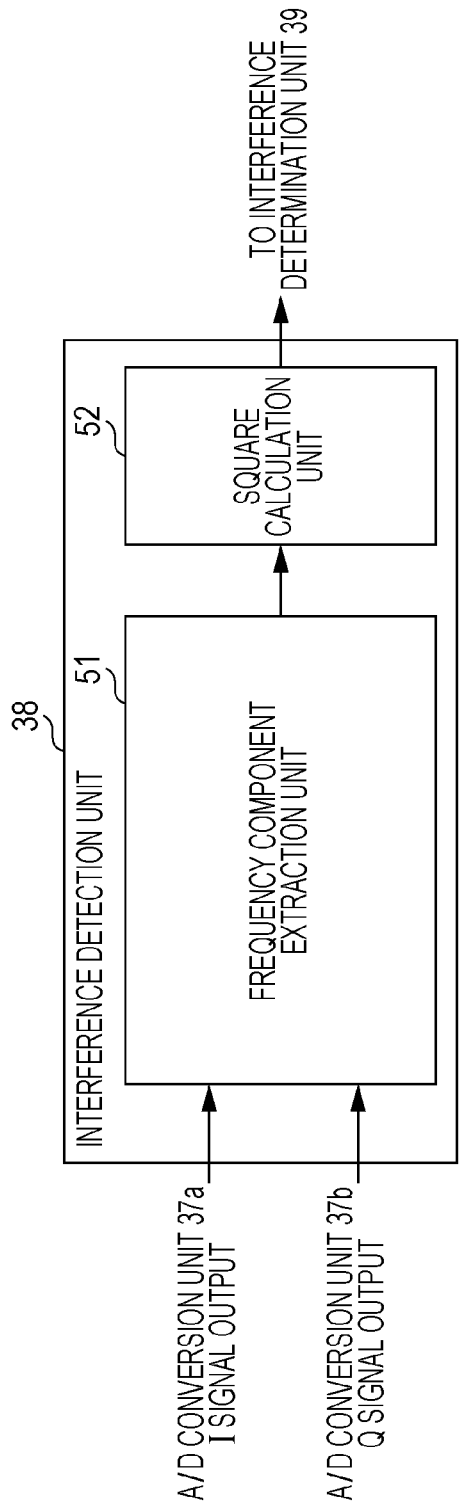
FIG. 4 is a block diagram depicting the internal configuration of an interference detection unit of FIG. 1.

The interference detection unit 38 detects one or more interference signal components in an interference measurement segment on the basis of a control signal from the transmission control unit 12, and outputs the detected one or more interference signal components to the interference determination unit 39. FIG. 4 is a block diagram depicting the internal configuration of the interference detection unit 38 of FIG. 1. In FIG. 4, from the digital data output from the A/D conversion units 37a and 37b, a frequency component extraction unit 51 extracts one or more interference signal components in a specific frequency component included within the baseband band of the radar signals used by the radar device 10, and outputs to a square calculation unit 52.

The square calculation unit 52 squares the one or more interference signal components output from the frequency component extraction unit 51, and outputs to the interference determination unit 39.

The frequency component extraction unit 51, in order to extract a specific frequency component included within the baseband band of the radar signals used by the radar device 10, performs a correlation calculation between a discrete sample x(k, M), which is the digital data output from the A/D conversion units 37a and 37b, and a coefficient sequence $FS_n$ for extracting the specific frequency component (see expression (4)). Here, L_FS is the sequence length of the coefficient sequence $FS_n$.

[Equation 4]

$$IC(k, M) = \sum_{n=1}^{L\_FS} x(k+n-1, M) \times FS_n \quad (4)$$

By using the coefficient sequence indicated in expression (5) as the coefficient sequence $FS_n$, a $1/4^{th}$ positive frequency component is extracted from a sampling frequency Ns/Tp of the A/D conversion units 37a and 37b, and thus a specific frequency component Ns/(4Tp) can be extracted.

[Equation 5]

$$\{FSA_1, FS_2, FS_3, FS_4\} = \{1, j, -1, -j\} \quad (5)$$

Figure 5:
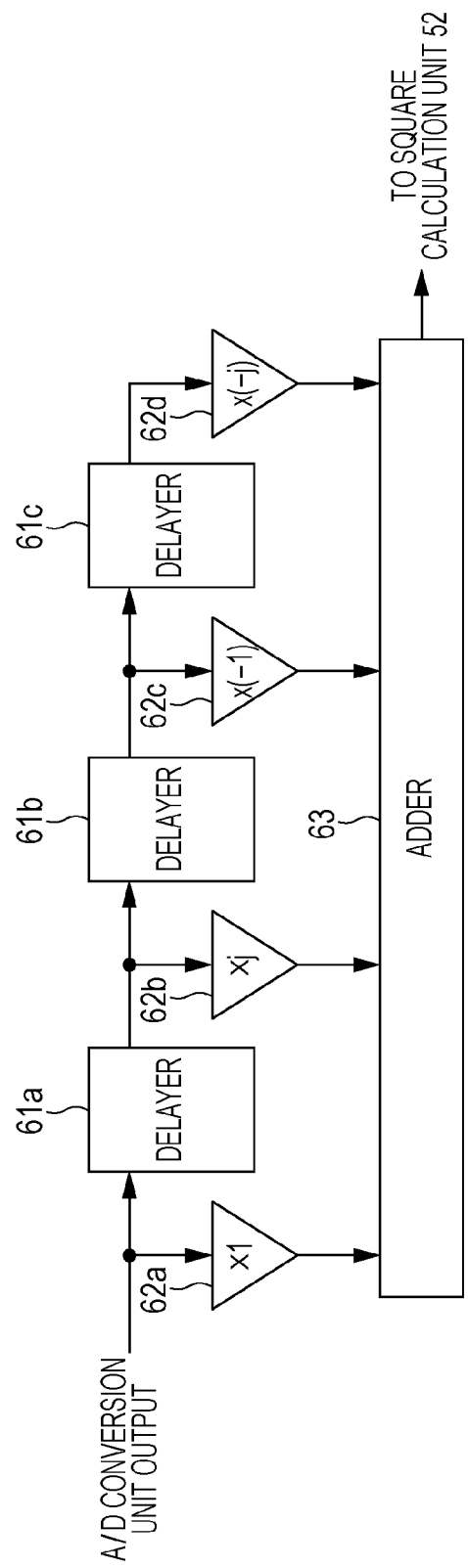
FIG. 5 is a block diagram depicting the internal configuration of a frequency component extraction unit of FIG. 4.

Furthermore, the frequency component extraction unit 51, which uses the coefficient sequence $FS_n$ indicated in expression (5), can be realized with the configuration depicted in FIG. 5. The frequency component extraction unit 51 depicted in FIG. 5 is provided with delayers 61a to 61c, coefficient multipliers 62a to 62d, and an adder 63.

The delayers 61a to 61c delay input data and output delayed data. The delayer 61a delays the complex number made up of the I signal and the Q signal output from the A/D conversion units 37a and 37b, and outputs a delayed discrete sample to the coefficient multiplier 62b and the delayer 61b. The delayer 61b delays the output from the delayer 61a, and outputs delayed data to the coefficient multiplier 62c and the delayer 61c. The delayer 61c delays the output from the delayer 61b, and outputs a digit of delayed data to the coefficient multiplier 62d.

The coefficient multiplier 62a multiplies the discrete sample output from the A/D conversion units 37a and 37b by a coefficient 1, and outputs the multiplication result to the adder 63. The coefficient multiplier 62b multiplies the data output from the delayer 61a by a coefficient j, and outputs the multiplication result to the adder 63. The coefficient multiplier 62c multiplies the data output from the delayer 61b by a coefficient −1, and outputs the multiplication result to the adder 63. The coefficient multiplier 62d multiplies the data output from the delayer 61c by a coefficient −j, and outputs the multiplication result to the adder 63. In should be noted that j is an imaginary unit.

The adder 63 adds the multiplication results output from the coefficient multiplier 62a to 62d, and outputs the addition result to the square calculation unit 52.

Furthermore, by using the coefficient sequence indicated in expression (6) as the coefficient sequence $FS_n$, a $1/4^{th}$ negative frequency component is extracted from the sampling frequency Ns/Tp of the A/D conversion units 37a and 37b, and therefore a specific frequency component −Ns/(4Tp) can be extracted.

[Equation 6]

$$\{FS_1, FS_2, FS_3, FS_4\} = \{1, -j, -1, j\} \quad (6)$$

Furthermore, by using the coefficient sequence indicated in expression (7) as the coefficient sequence $FS_n$, a $1/8^{th}$ positive frequency component is extracted from the sampling frequency Ns/Tp of the A/D conversion units 37a and 37b, and therefore a specific frequency component Ns/(8Tp) can be extracted.

[Equation 7]

$$\{FS_1, FS_2, FS_3, FS_4, FS_5, FS_6, FS_7, FS_8\} = \{1, \exp(j\pi/4), j, \exp(j3\pi/4), -1, \exp(-j\pi/4), -j, \exp(-j3\pi/4)\} \quad (7)$$

Furthermore, by using the coefficient sequence indicated in expression (8) as the coefficient sequence $FS_n$, a $1/8^{th}$ negative frequency component is extracted from the sampling frequency Ns/Tp of the A/D conversion units 37a and 37b, and therefore a specific frequency component −Ns/(8Tp) can be extracted.

[Equation 8]

$$\{FS_1, FS_2, FS_3, FS_4, FS_5, FS_6, FS_7, FS_8\} = \{1, \exp(-j\pi/4), -j, \exp(-j3\pi/4), -1, \exp(j\pi/4), j, \exp(j3\pi/4)\} \quad (8)$$

Furthermore, by using the coefficient sequence indicated in expression (9) as the coefficient sequence $FS_n$, a $1/(2G)^{th}$ positive frequency component is extracted from the sampling frequency Ns/Tp of the A/D conversion units 37a and 37b, and therefore a specific frequency component Ns/(2G×Tp) can be extracted. Here, n=1, . . . , 2G.

[Equation 9]

$$FS_n = \exp[j\pi(n-1)/G] \quad (9)$$

Furthermore, by using the coefficient sequence indicated in expression (10) as the coefficient sequence $FS_n$, a $1/(2G)^{th}$ negative frequency component is extracted from the sampling frequency Ns/Tp of the A/D conversion units 37a and 37b, and therefore a specific frequency component −Ns/(2G×Tp) can be extracted. Here, n=1, . . . , 2G.

[Equation 10]

$$FS_n = \exp[-j\pi(n-1)/G] \quad (10)$$

It should be noted that detection sensitivity can be improved by additionally repeatedly using any of the aforementioned coefficient sequences. In other words, in the case where the coefficient length of the coefficient sequence $FS_n$ for extracting a specific frequency component is taken as L_FS, the detection sensitivity for the specific frequency component can be increased N times when that coefficient sequence is repeated N times (an SNR improvement of 10 $\log_{10}(N)$ [dB]). For example, by using a coefficient sequence $\{1, -j, -1, j, 1, -j, -1, j\}$ in which $\{FS_1, FS_2, FS_3, FS_4\} = \{1, -j, -1, j\}$ is repeated twice, the detection sensitivity for the specific frequency component −Ns/(4Tp) can be doubled.

The interference determination unit 39, on the basis of the control signal output from the transmission control unit 12, determines whether or not the one or more interference signal components output from the interference detection unit 38 in an interference measurement segment exceeds a prescribed determination level. The interference determination unit 39 determines that an interference component is not present in the case where each of the one or more interference signal components is equal to or less than the determination level, and determines that an interference component is present in the case where any of the one or more interference signal components exceeds the determination level.

It should be noted that the interference detection unit 38 and the interference determination unit 39 are provided in at least one antenna system processing unit from among a first antenna system processing unit to an $Na^{th}$ antenna system processing unit.

The interference countermeasure control unit 13 performs interference countermeasure control in the subsequent distance measurement segment on the basis of the interference determination result output from the interference determination unit 39 in the interference measurement segment. In other words, in the case where the interference determination unit 39 has determined that an interference component is present, in order to reduce or suppress the one or more interference signal components, control that uses any of the following or a combination thereof is applied in the subsequent distance measurement segment to perform radar transmission/reception operations in the distance measurement segment.

(1) The interference countermeasure control unit 13 performs control that changes the carrier frequency of the radar device 10. In other words, the transmission carrier frequency of the transmission RF unit 25 is changed. Furthermore, it is made possible for the transmission carrier frequency changed by the transmission RF unit 25 to be received also by the reception RF unit 32. The frequency is changed by performing control that shifts a preset frequency interval. It should be noted that, in the case where a configuration that detects a positive/negative specific frequency component is used as the interference detection unit 38, it becomes possible for the frequency signal component to be reduced or suppressed to a greater extent by changing the transmission carrier frequency in a frequency direction in which the detected positive/negative frequency components are low in number. Furthermore, control may be performed that, as the detected one or more interference signal components increase in number, widens the frequency interval that is used when the frequency is changed. It thereby becomes possible for the one or more interference signal components to be reduced or suppressed more effectively.

(2) In the case where the vertical beam direction of the transmission antenna 26 or the reception antenna 31 of the radar device 10 can be controlled, the interference countermeasure control unit 13 performs control that changes the beam direction to a downward direction for a prescribed time interval.

(3) The interference countermeasure control unit 13 performs control that, for a prescribed time interval, increases the code length of the radar transmission signals used by the radar device 10.

The correlation calculation unit 40, in the distance measurement segment following interference detection and interference countermeasure control in an interference measurement segment, performs a correlation calculation between a discrete sample x(k, M) output from the A/D conversion units 37a and 37b at each radar transmission period and a pulse compression code $a_n$ of the code length L that is transmitted. Here, n=1, . . . , L. A sliding correlation calculation in an $M^{th}$ radar transmission period is performed on the basis of the following expression (11), for example.

[Equation 11]

$$AC(k, M) = \sum_{n=1}^{L} x(k + Ns(n-1), M)a_n^*  \quad (11)$$

In expression (11), AC(k, M) indicates a correlation calculation value of a discrete timepoint k. The asterisk (*) represents a complex conjugate operator. Furthermore, the calculation of AC(k, M) is performed for a period of k=1, . . . , (Nr+Nu) Ns/No.

Figure 6:
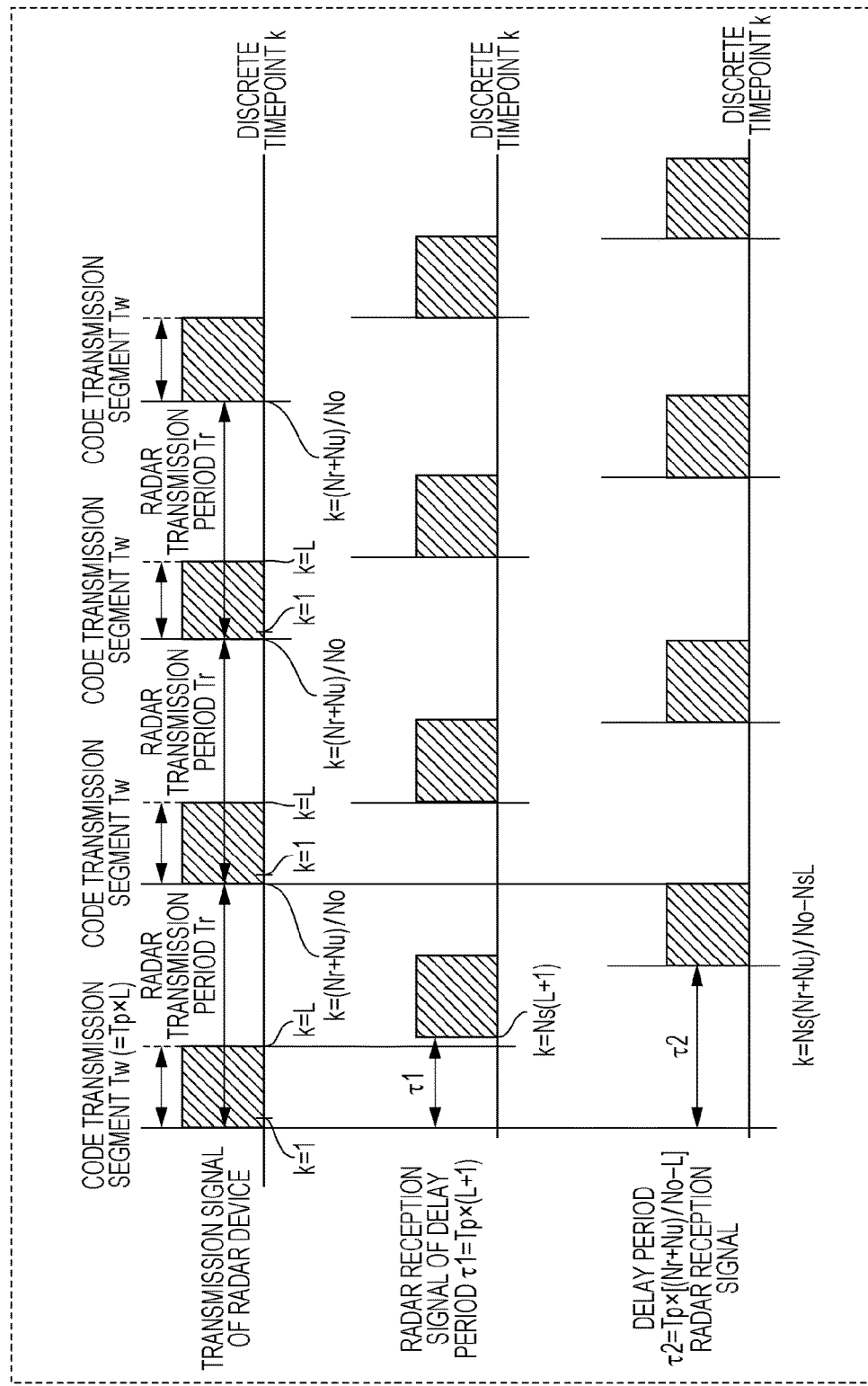
FIG. 6 is a drawing depicting transmission timings of a radar transmission signal and reception timings of a reflected wave.

It is possible for the calculation in the correlation calculation unit 40 to be performed for k=1, . . . , (Nr+Nu)Ns/No; however, it should be noted that the measurement range (range of k) may be additionally limited by the presence range for the target to be measured of the radar device 10. It thereby becomes possible for the calculation processing amount to be reduced. For example, the measurement range may be limited to k=Ns(L+1), . . . , (Nr+Nu)Ns/No−NsL. In this case, as depicted in FIG. 6, measurement is not performed in a time segment that corresponds to a code transmission segment, and even in a case such as when a radar transmission signal directly enters the radar reception unit 30, it becomes possible to perform measurement with the effect thereof having been eliminated. In the case where the measurement range (range of k) is limited, the following processing also similarly applies processing in which the measurement range (range of k) is limited.

On the basis of the correlation calculation value AC(k, M), which is an output of the correlation calculation unit 40 for each discrete timepoint k, the integration unit 41 performs Np number of summations for a period (Tr×Np), which is a plural Np number of the radar transmission periods Tr, in accordance with the following expression (12).

[Equation 12]

$$CI(k, m) = \sum_{g=1}^{Np} AC(k, Np(m-1) + g) \quad (12)$$

In expression (12), Np is an integer value that is equal to or greater than 1. In other words, the integration unit 41 performs summation Np plurality of times with single units being constituted by the output of the correlation calculation unit 40 obtained with the radar transmission periods Tr serving as units. In other words, a correlation value CI(k, m) that is added with the timings of the discrete timepoints k being aligned is calculated at each discrete timepoint k with AC(k, Np(m−1)+1) to AC(k, Np×m) serving as units. It should be noted that m is a natural number. Thus, due to the effect of the addition, the SNR can be increased and the measurement performance relating to estimating the arrival distance of the target can be improved, in a range in which reception signals of reflected waves from the target have a high correlation, in a time range in which addition is performed Np times.

A condition with which the phase components are within a certain range for a segment in which addition is performed is required in order for an ideal addition gain to be obtained, and the number of times that addition is to be applied is set on the basis of an assumed maximum movement speed of the target to be measured. This is because, as the assumed maximum speed of the target increases, the time period in which time correlation is high becomes shorter due to the influence of Doppler frequency fluctuations included in the reflected waves from the target, the Np becomes a small value, and the gain improvement effect brought about by addition decreases.

The Doppler frequency analysis unit 42 performs coherent integration with CI(k, Nc(w−1)+1) to CI(k, Nc×w), which are Nc number of outputs of the integration unit 41 obtained at each discrete timepoint k, serving as single units, the timings of the discrete timepoints k being aligned, and a phase fluctuation $\Phi(fs)=2\pi fs(Tr \times Np)\Delta\Phi$, which corresponds to 2Nf number of different Doppler frequencies fsΔΦ, being corrected in accordance with the following expression (13).

[Equation 13]

$$FT\_CI^{Nant}(k, fs, w) = \sum_{q=0}^{Nc-1} CI(k, Nc(w-1)+q+1) \quad (13)$$
$$\exp[-j\phi(fs)q]$$
$$= \sum_{q=0}^{Nc-1} CI(k, Nc(w-1)+q+1)$$
$$\exp[-j2\pi fs TrNpq\Delta\phi]$$

In expression (13), $FT\_CI^{Nant}(k, fs, w)$ is the $w^{th}$ output by the Doppler frequency analysis unit 42, and indicates a coherent integration result of the Doppler frequencies $fs\Delta\Phi$ at the discrete timepoints k, in the $Nant^{th}$ antenna system processing unit. It should be noted that Nant=1 to Na, fs=−Nf+1, . . . , 0, Nf, k=1, (Nr+Nu)Ns/No, w is a natural number, and 40 is a phase rotation unit. Thus, in each antenna system processing unit, $FT\_CI^{Nant}(k, -Nf+1, w)$, . . . , $FT\_CI^{Nant}(k, Nf-1, w)$, which are coherent integration results that correspond to 2Nf number of Doppler frequency components of each discrete timepoint k, are obtained for each period (Tr×Np×Nc), which is a plural Np×Nc number of the radar transmission periods Tr.

The aforementioned processing equates to the output of the integration unit 41 being subjected to discrete Fourier transform processing at a sampling interval Tm=(Tr×Np) and a sampling frequency fm=1/Tm in the case where $\Delta\Phi=1/Nc$.

Furthermore, by setting Nf to a number that is a power of 2, fast Fourier transform processing (FFT) can be applied and the calculation processing amount can be greatly reduced. It should be noted that, at such time, in the case where Nf>Nc, by performing zero filling processing in which CI(k, Nc(w−1)+q)=0 in regions where q>Nc, likewise, fast Fourier transform processing can be applied and the calculation processing amount can be greatly reduced.

It should be noted that, in the aforementioned Doppler frequency analysis unit 42, FFT processing may not be performed, and calculation processing in which a product sum calculation given by expression (13) is successively performed may be carried out (with respect to CI(k, Nc(w−1)+q+1), which is Nc number of outputs of the integration unit 41 obtained at each discrete timepoint k, a coefficient $\exp[-j2\pi fsNpq\Delta\Phi]$ corresponding to fs=−Nf+1, . . . , 0, Nf−1 is generated, and product sum calculation processing is successively performed). Here q=0 to Nc−1.

Hereinafter, the outputs $FT\_CI^1(k, fs, w)$, −, $FT\_CI^{Na}(k, fs, w)$ from the Doppler frequency analysis unit 42 obtained by the same processing being respectively carried out in the first antenna system processing unit to the $Na^{th}$ antenna system processing unit is collectively denoted as a correlation vector h(k, fs, w), and is used to describe processing in which direction estimation based on phase differences among reception antennas is performed with respect to reflected waves from the target.

[Equation 14]

$$h(k, fs, w) = \begin{bmatrix} FT\_CI^1(k, fs, w) \\ FT\_CI^2(k, fs, w) \\ \vdots \\ FT\_CI^{Na}(k, fs, w) \end{bmatrix} \quad (14)$$

It should be noted that, instead of the aforementioned correlation matrix, a correlation vector may be calculated with one of the plurality of antenna system processing units serving as a reference phase.

[Equation 15]

$$h(k, fs, w) = \begin{bmatrix} FT\_CI^1(k, fs, w) \\ FT\_CI^2(k, fs, w) \\ \vdots \\ FT\_CI^{Na}(k, fs, w) \end{bmatrix} \frac{FT\_CI^1(k, fs, w)^*}{|FT\_CI^1(k, fs, w)|} \quad (15)$$

In expression (15), the superscript asterisk (*) indicates a complex conjugate operator, and k=1, . . . , (Nr+Nu)Ns/No.

In the direction estimation unit 43, the correlation vector h(k, fs, w) from the $w^{th}$ number-y Doppler frequency analysis unit 42 output from the first antenna system processing unit to the $Na^{th}$ antenna system processing unit is corrected with respect to phase deviation and amplitude deviation among the antenna system processing units using an array correction value, and a correlation vector h_after_cal(k, fs, w) in which these corrections have been performed is used to perform direction estimation processing based on the phase differences among reception antennas of arriving reflected waves.

[Equation 16]

$$h\_after\_cal(k, fs, w) = \begin{bmatrix} h\_cal_{[1]} & 0 & \cdots & 0 \\ 0 & h\_cal_{[2]} & \ddots & \cdots \\ \vdots & \ddots & \ddots & 0 \\ 0 & \cdots & 0 & h\_cal_{[Na]} \end{bmatrix} h_y(k, fs, w) \quad (16)$$

In other words, in the direction estimation processing, an azimuth direction θ indicated in the following expression (17) is made variable using the correlation vector h_after_cal(k, fs, w) in which phase deviation and amplitude deviation have been corrected, with respect to each discrete timepoint k and each Doppler frequency $fs\Delta\Phi$, or discrete timepoints k and Doppler frequencies $fs\Delta\Phi$ with which the norm of h_after_cal(k, fs, w) or the square value thereof becomes equal to or greater than a prescribed value. A direction estimation evaluation function value P(θ, k, fs, w) is then calculated, and the azimuth direction with which the largest value thereof is obtained is taken as an arrival direction estimation value DOA(k, fs, w).

[Equation 17]

$$DOA(k, fs, w) = \underset{\theta_u}{\arg\max}\, P(\theta_u, k, fs, w) \quad (17)$$

In expression (17), u=1, . . . , NU. It should be noted that arg max P(x) is an operator with which the value of a domain having the largest function value P(x) is taken as an output value.

It should be noted that the evaluation function value P(θ, k, fs, w) is an evaluation function value of various kinds according to the arrival direction estimation algorithm. For example, an estimation method that uses an array antenna disclosed in the literature ('Direction-of-Arrival Estimation Using Signal Subspace Modeling,' J. A. Cadzow, Aerospace and Electronic Systems, IEEE Transactions, volume 28, issue 1, publication year: 1992, pages 64-79) can be used, and a beam forming method can be represented by the following expression (18).

[Equation 18]

$$P(\theta_u, k, fs, w) = a(\theta_u)^H H\_after\_cal(k, fs, w) a(\theta_u) \quad (18)$$

In expression (18), the superscript H is a Hermitian transposition operator. Other than this, it is also possible for techniques such as Capon and MUSIC to be similarly applied.

h_after_cal(k, fs, w) is a correlation matrix, and is given by the following expression (19).

[Equation 19]

$$H\_after\_cal(k, fs, w) = h\_after\_cal(k, fs, w) h\_after\_cal(k, fs, w)^H \quad (19)$$

The direction estimation unit 43 then, in addition to the calculated $w^{th}$ arrival direction estimation value DOA(k, fs, w), uses the discrete timepoint k, the Doppler frequencies fs$\Delta\Phi$, and the evaluation function value P(DOA(k, fs, w), k, fs, w) of that time as radar positioning results.

Figure 7:
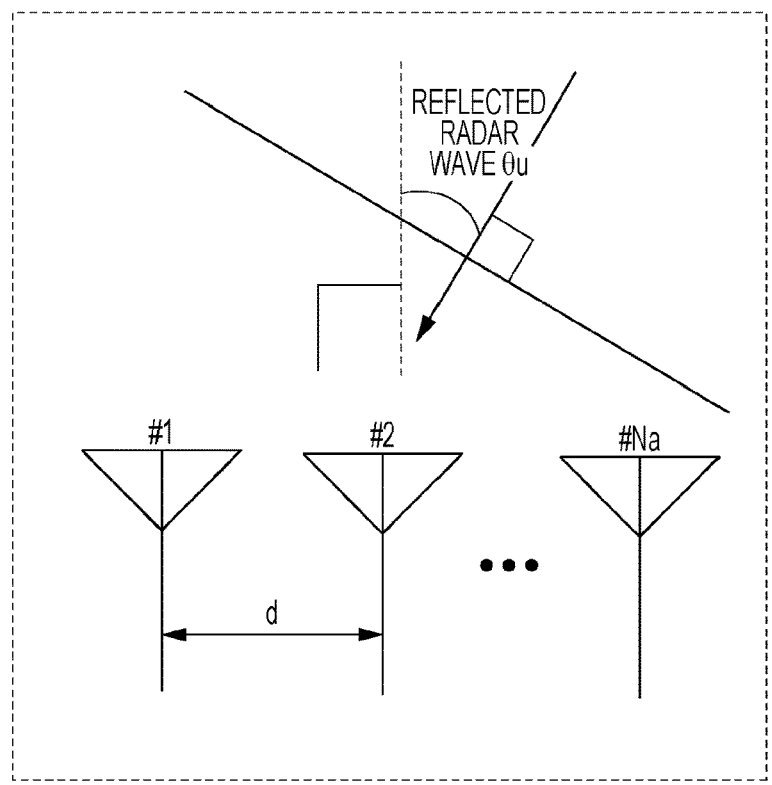
FIG. 7 is a drawing depicting a relationship between the arrangement of reception antenna elements that make up an array antenna and an azimuth angle.

Here, a direction vector $a(\theta_u)$ is an $Na^{th}$ order column vector in which a complex response of an array antenna in the case where radar reflected waves have arrived from an $\theta_u$ direction are taken as elements. The array antenna complex response $a(\theta_u)$ represents a phase difference that is geometric-optically calculated at element intervals among antennas. For example, in the case where the element intervals of the array antenna are arranged at equal intervals d on a straight line (see FIG. 7), a direction vector can be given by the following expression (20).

[Equation 20]

$$a(\theta_u) = \begin{bmatrix} 1 \\ \exp\{j2\pi d \sin\theta_u / \lambda\} \\ \vdots \\ \exp\{j2\pi(N_a - 1)d\sin\theta_u / \lambda\} \end{bmatrix} \quad (20)$$

In expression (20), $\theta_u$ is obtained by causing the azimuth range in which arrival direction estimation is performed to change by prescribed azimuth intervals $\beta$, and is set as follows, for example. Also, $\theta_u = \theta$ min+u=0, . . . , NU, and NU=floor[($\theta$ max−$\theta$ min)/$\beta$]+1. Here, floor(x) is a function that outputs the largest integer value that does not exceed a real number x.

It should be noted that timepoint information may be converted into distance information and output. The following expression (21) is used when the discrete timepoint k is converted into distance information R(k).

[Equation 21]

$$R(k) = k \frac{TwC0}{2L} \quad (21)$$

In expression (21), Tw represents a code transmission segment, L represents a pulse code length, and C0 represents light speed.

Furthermore, Doppler frequency information may be converted into a relative speed component and output. The following expression (22) is used when the Doppler frequency fs$\Delta\Phi$ is converted into a relative speed component vd(fs).

[Equation 22]

$$vd(fs) = \frac{\lambda}{2} fs\Delta\theta \quad (22)$$

In expression (22), $\lambda$ is the wavelength of a carrier frequency of an RF signal output from the transmission RF unit 25.

Next, a calculation simulation of the aforementioned interference detection unit 38 will be described.

Figure 8:
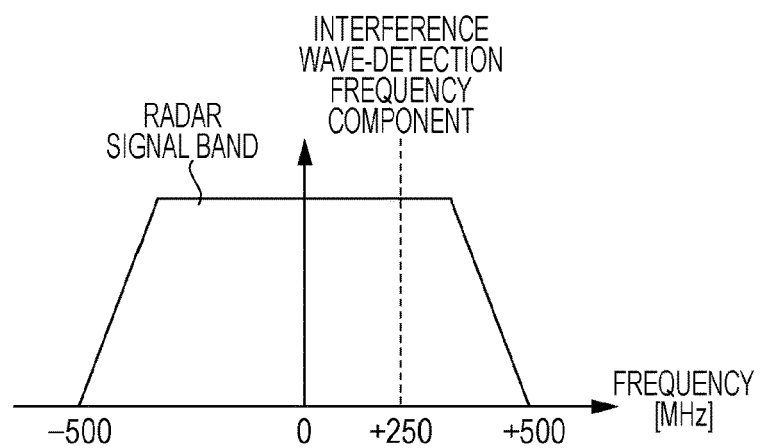
FIG. 8 is a drawing depicting a relationship between a radar signal band and an interference wave-detection frequency component.

The radar device 10 uses a coefficient sequence {$FS_1$, $FS_2$, $FS_3$, $FS_4$}={1, j, −1, −j} in the frequency component extraction unit 51 to detect a frequency component of a 250-MHz interference signal depicted in FIG. 8, for example, in the radar signal band (500 MHz) of the radar device, with the 1-GSps (giga sample per second) A/D conversion units 37a and 37b.

Figure 9:
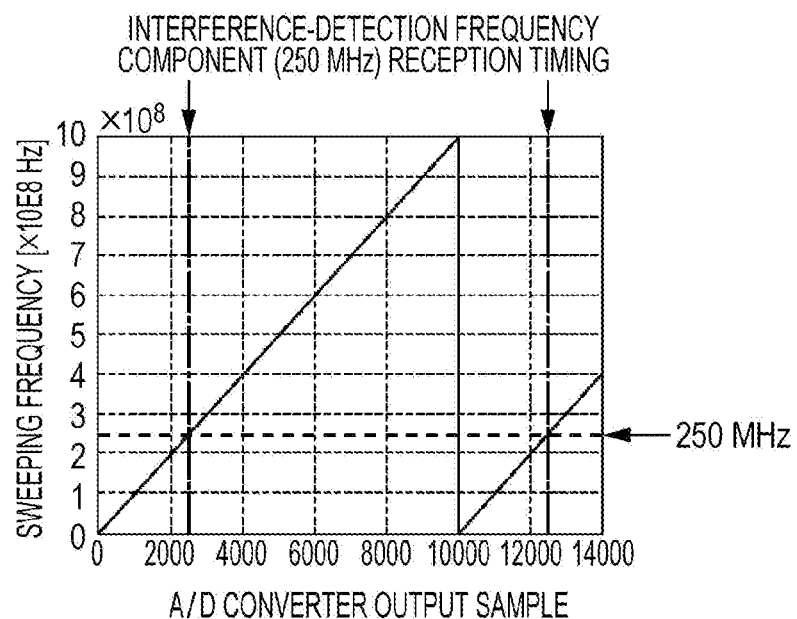
FIG. 9 is a drawing depicting an FMCW modulated wave of another radar device.

Furthermore, another radar device that uses FMCW uses the same carrier frequency as the radar device 10 to, as depicted in FIG. 9, perform 1-GHz frequency sweeping every 10 μs, and cause interference to the radar device 10.

Figure 10:
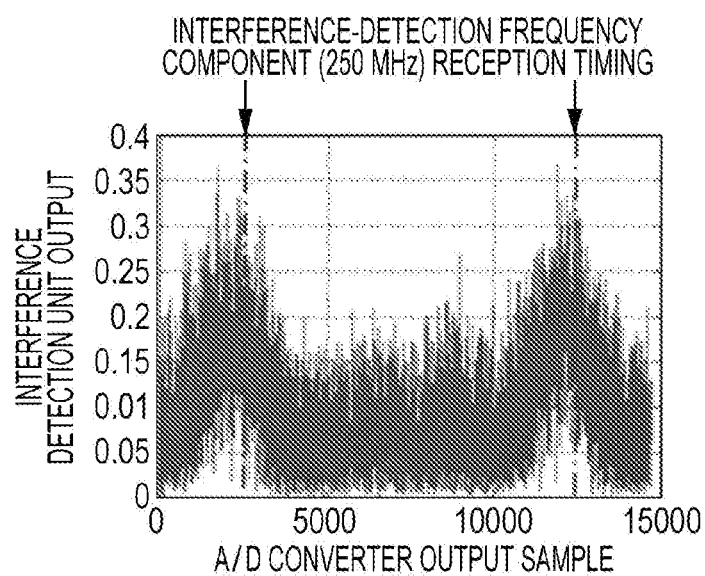
FIG. 10 is a drawing depicting the output of an interference detection unit.

The result of the case where an interference wave level is approximately the same as the noise level of the radar device 10 is depicted in FIG. 10. From FIG. 10, it is apparent that the output level according to the interference detection unit 38 increases at a reception timing at which the sweeping frequency of the other radar device that uses FMCW becomes 250 MHz. Detection sensitivity can also be additionally improved by increasing the number of times that the coefficient sequence with which the frequency component of the interference signal is detected is repeated.

In this way, according to embodiment 1, an interference measurement segment is provided in which a radar transmission signal is not transmitted in the radar transmission unit 20, and, in the radar reception unit 30, detection of a specific frequency component within the passband of the radar device 10 is performed in the interference measurement segment for one or more interference signal components to be detected. In the case where another radar device transmits an FMCW wave as an interference wave, the FMCW wave is frequency-modulated and therefore has the property that a transmitted frequency component changes, and therefore, by detecting the specific frequency component within the passband of the radar device in the interference measurement segment, it becomes possible to detect interference from the other radar device.

Furthermore, detection sensitivity can be increased by increasing the number of times that a coefficient sequence for extracting the specific frequency component of the interference detection unit 38 is repeated. Furthermore, the interference detection unit 38 can extract the specific frequency component by way of a simple circuit configuration without using frequency analysis processing represented by fast Fourier transform processing, and interference detection can be realized.

Embodiment 2

In embodiment 2 of the present disclosure, the relation between frequency sweeping and radar transmission intervals will be described.

With regard to frequency sweeping periods of another radar device that uses FMCW, there is a type in which frequency sweeping is performed at comparatively fast intervals such as of the order of several tens of microseconds (fast frequency modulation type), and a type in which frequency sweeping is performed at comparatively slow periods such as of the order of milliseconds or the order of several tens of milliseconds.

In the case where the interference measurement segment of the radar device 10 is longer than the frequency sweeping period of the other radar device that uses FMCW, and a frequency component included within the signal band of the radar device 10 is included within the frequency range in which the other radar device performs frequency sweeping, detection becomes possible in one interference measurement segment.

However, even in the case where the interference measurement segment of the radar device 10 is shorter than the frequency sweeping period of the other radar device that uses FMCW, and a frequency component included within the signal band of the radar device 10 is included within the frequency range in which the other radar device performs frequency sweeping, the other radar device sometimes sweeps a frequency component that is included within the signal band of the radar device 10 in a distance measurement segment, and there is a possibility of interference signal detection failing in the interference measurement segment.

With respect to the aforementioned interference signal detection failure, the probability of detecting an interference wave can be increased by using, in the interference detection unit 38, a configuration that detects a plurality of specific frequency components included within a signal band.

Figure 11:
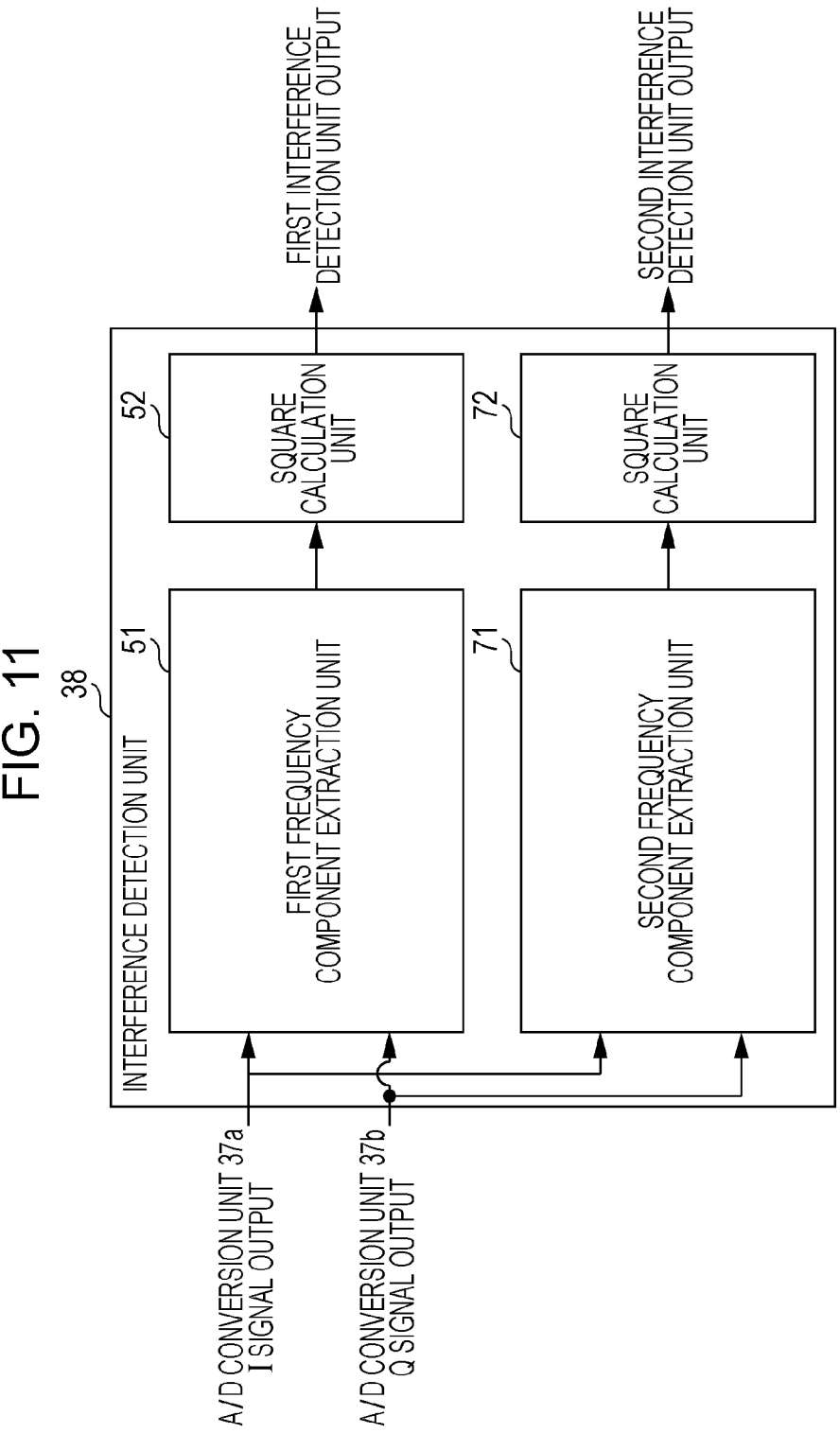
FIG. 11 is a block diagram depicting the internal configuration of an interference detection unit according to embodiment 2 of the present disclosure.

FIG. 11 depicts a configuration for the interference detection unit 38 with which two frequency components are detected as specific frequency components. Positive/negative frequency components may be used as a first frequency component and a second frequency component. For example, as a result of a first frequency component extraction unit 51 using $\{FS_1, FS_2, FS_3, FS_4\}=\{1, j, -1, -j\}$, and a second frequency component extraction unit 71 using $\{FS_1, FS_2, FS_3, FS_4\}=\{1, -j, -1, j\}$, specific positive/negative frequency components $\pm Ns/(2Tp)$ can be extracted.

In the case where the interference measurement segment of the radar device 10 is shorter than the frequency sweeping period of the other radar device that uses FMCW by approximately 1/D (D being an arbitrary number), the probability of detecting an interference wave can be increased by providing an interference detection unit 38 that detects approximately D number of frequency components in substantially equal frequency intervals within the signal band of the radar device 10.

Embodiment 3

Figure 12:
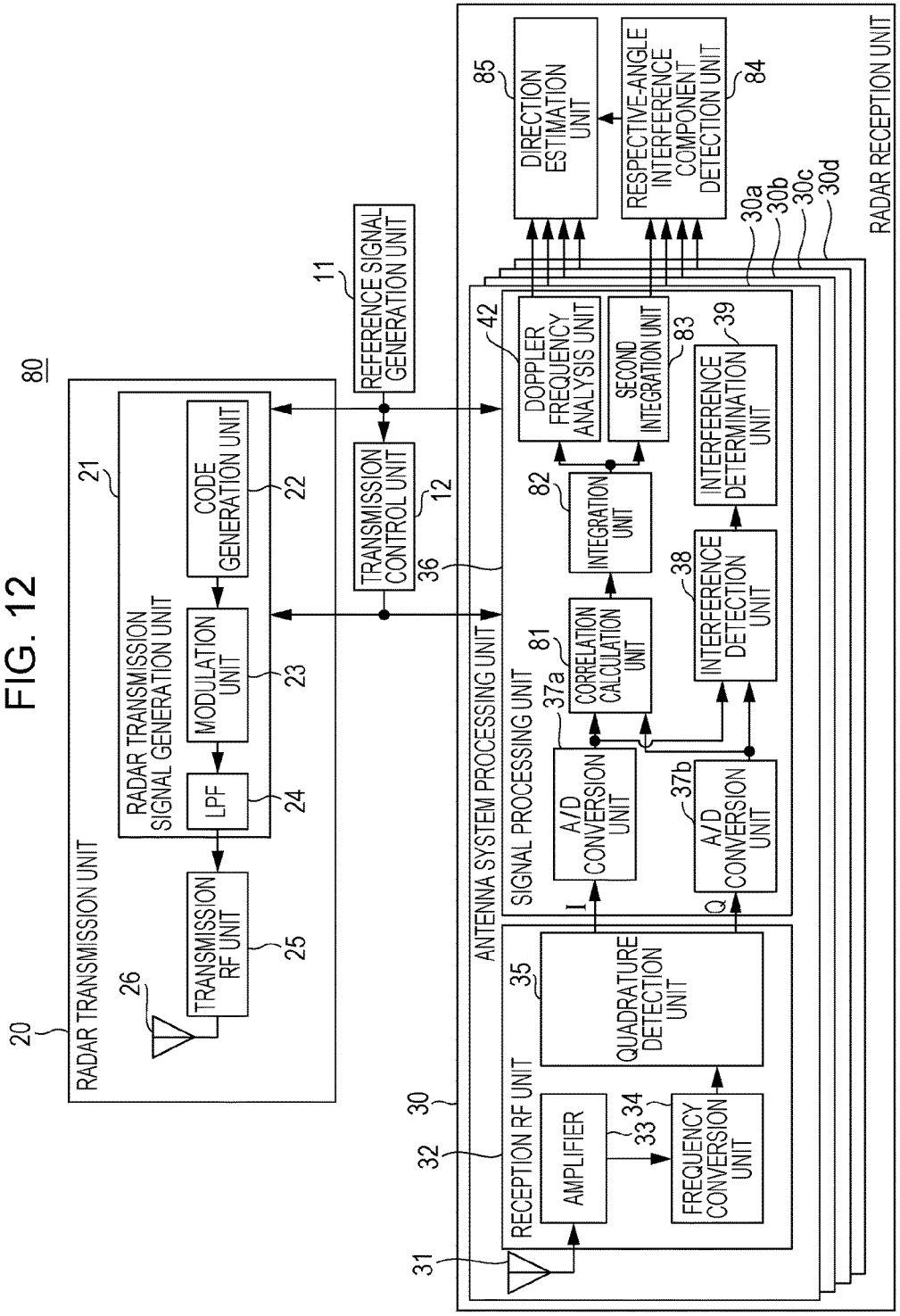
FIG. 12 is a block diagram depicting the configuration of a radar device according to embodiment 3 of the present disclosure.

FIG. 12 is a block diagram depicting the configuration of a radar device 80 according to embodiment 3 of the present disclosure. FIG. 12 is different from FIG. 1 in that the interference countermeasure control unit 13 has been removed, the correlation calculation unit 40 has been changed to a correlation calculation unit 81, the integration unit 41 has been changed to an integration unit 82, the direction estimation unit 43 has been changed to a direction estimation unit 85, and a second integration unit 83 and a respective-angle interference component detection unit 84 have been added.

The correlation calculation unit 81 performs a correlation calculation in the same way as the correlation calculation unit 40 in interference measurement segments in addition to distance measurement segments. The integration unit 82 also performs addition processing in the same way as the integration unit 41 in interference measurement segments in addition to distance measurement segments.

The second integration unit 83 performs coherent integration with respect to with floor($N_{IM}$/Np) number of outputs from the integration unit 82 obtained at each discrete timepoint k, with the timings of the discrete timepoints k being aligned. Here, floor(x) is a function that outputs the largest integer that is equal to or less than a real number x. The second integration unit 83 outputs a coherent integrated result CCI(k) to the respective-angle interference component detection unit 84.

The respective-angle interference component detection unit 84 uses collected outputs CCI(k) from the second integration unit 83 obtained by the same processing being respectively carried out in the first antenna system processing unit to the $Na^{th}$ antenna system processing unit as correlation vectors given in the following expressions (23) and (24) to perform direction estimation based on phase differences between reception antennas with respect to reflected waves from a target, and calculates an interference component for each beam angle (hereinafter referred to as a "respective-angle interference component") $PI(\theta_u)$. In the direction estimation processing, calculation processing that uses the described beam forming method is performed in the direction estimation unit 85.

[Equation 23]

$$h_I = \frac{1}{(Nr+Nu)Ns/No} \sum_{k=1}^{(Nr+Nu)Ns/No} \begin{bmatrix} CCI^1(k) \\ CCI^2(k) \\ \vdots \\ CCI^{Na}(k) \end{bmatrix} \frac{CCI^1(k)^*}{|CCI^1(k)|} \quad (23)$$

[Equation 24]

$$PI(\theta_u) = \left| a(\theta_u)^H \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Na]} \end{bmatrix} h_I \right|^2 \quad (24)$$

In the case where FMCW waves are received as interference from the other radar device, one or more interference signal components are detected in a substantially uniform manner regardless of the discrete timepoints k, and therefore detection sensitivity for one or more interference signal components can be increased by, in expressions (23) and (24), addition processing being performed at the discrete timepoints k (in other words, the distance direction). For example, by performing addition processing for N number of samples with respect to the discrete timepoints k (in other words, the distance direction), a 5 $\log_{10}(N)$ [dB] SNR improvement is achieved. For example, by performing addition processing with respect to 512 samples, an SNR improvement of approximately 13 dB can be achieved.

In the case where it is determined that the output from the interference determination unit 39 in an interference measurement segment includes an interference component, the respective-angle interference component detection unit 84 outputs respective-angle interference components $PI(\theta_u)$ to the direction estimation unit 85. On the other hand, in the case where it is determined that the output from the interference determination unit 39 does not include an interference component, the respective-angle interference component detection unit 84 outputs the respective-angle interference components PI($\theta_u$) all as zero to the direction estimation unit 85.

The direction estimation unit 85, in a distance measurement segment, sets a determination threshold value for each angle on the basis of the respective-angle interference components PI($\theta_u$) detected in the interference measurement segment, with respect to the calculated $w^{th}$ arrival direction estimation value DOA(k, fs, w), the discrete timepoint k thereof, the Doppler frequency fs$\Delta\Phi$, and the evaluation function value P(DOA(k, fs, w), k, fs, w). In the case where the calculated $w^{th}$ arrival direction estimation value DOA(k, fs, w) is greater than $\alpha$PI($\theta_u$), the direction estimation unit 85 outputs the calculated $w^{th}$ arrival direction estimation value DOA(k, fs, w) as the signal of the target detected by the radar device 80. It should be noted that a is a prescribed coefficient value.

According to the aforementioned processing, in an interference measurement segment, an interference component for each angle can be detected, and a detection determination threshold value can be variably set for each angle on the basis of the interference power for each angle. Thus, the probability of an interference component being erroneously detected as a signal of the target detected by the radar device 80 can be reduced. Furthermore, in an interference measurement segment, by performing correlation calculation processing and coherent addition processing as in a distance measurement segment, a detection determination threshold value can be variably set for each angle in accordance with the interference state that actually occurs in the distance measurement segment.

Modified Example 1

Figure 13:
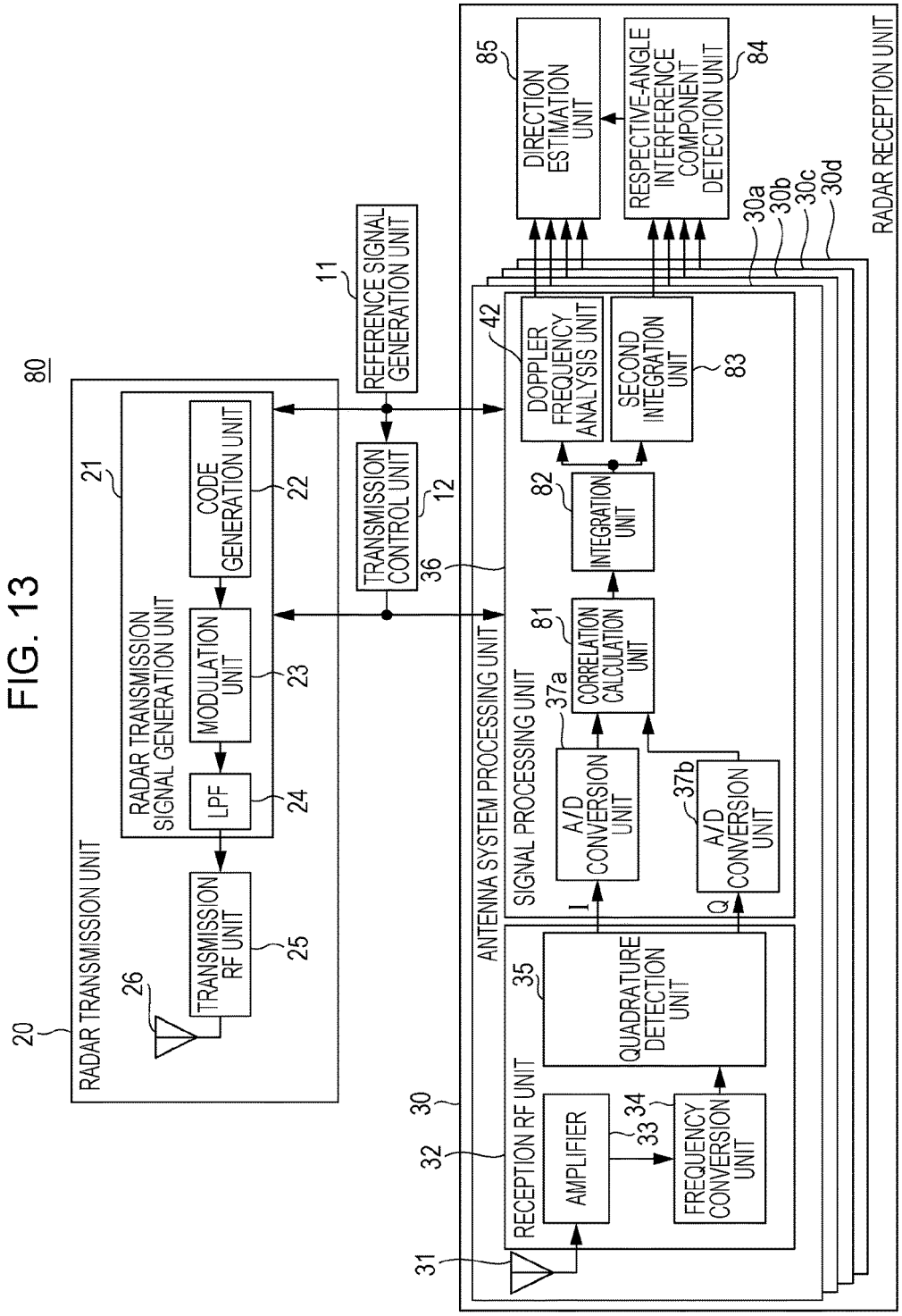
FIG. 13 is a block diagram depicting the configuration of a radar device according to modified example 1 of the present disclosure.

The present disclosure is not limited to the configuration of the radar device of the aforementioned embodiment 2, and may have the configuration depicted in FIG. 13. FIG. 13 is a drawing in which the interference detection unit 38 and the interference determination unit 39 have been removed from FIG. 12.

Modified Example 2

Figure 14:
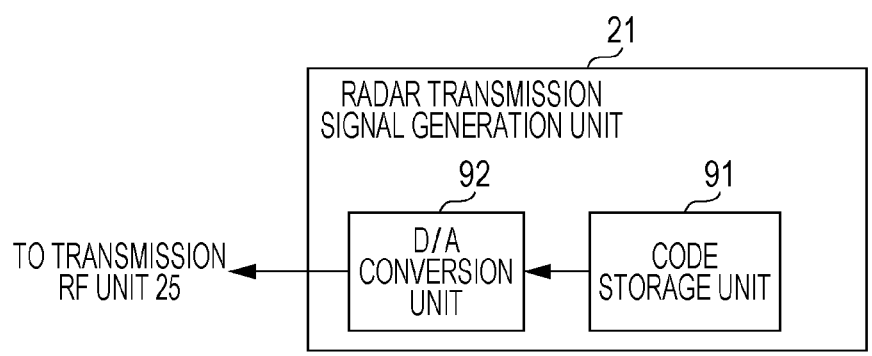
FIG. 14 is a block diagram depicting the internal configuration of a radar transmission signal generation unit according to modified example 2 of the present disclosure.

The radar transmission signal generation unit 21 is not limited to the configuration depicted in FIG. 1, and may have the configuration depicted in FIG. 14. The radar transmission signal generation unit 21 of FIG. 14 is provided with a code storage unit 91 and a D/A conversion unit 92. The code storage unit 91 stores code sequences in advance, and sequentially and cyclically reads out the stored code sequences and outputs to the D/A conversion unit 92.

The D/A conversion unit 92 converts a digital signal output from the code storage unit 91 into an analog baseband signal and outputs to the transmission RF unit 25.

The following are included as various aspects of the embodiments according to the present disclosure.

A radar device according to a first disclosure is provided with: a receiver which, in operation, receives one or more radar transmission signals transmitted from another radar device, in an interference measurement segment in which transmission of one or more radar transmission signals from the radar device is stopped; an A/D conversion circuitry which, in operation, converts the one or more radar transmission signals from the other radar device received by the receiver from one or more analog signals into one or more digital signals; and an interference detection circuitry which, in operation, performs a correlation calculation between each of the one or more discrete samples that is the one or more digital signals and a prescribed coefficient sequence to detect one or more prescribed frequency components included in the one or more digital signal, as one or more interference signal components.

The radar device according to a second disclosure is the radar device of the first disclosure, in which the interference detection circuitry performs the correlation calculation using a coefficient sequence in which the prescribed coefficient sequence is repeated.

The radar device according to a third disclosure is the radar device of the first disclosure, further provided with a transmitter which, in operation, stops the transmission of the one or more radar transmission signals in the interference measurement segment, and transmits the one or more radar transmission signals in a distance measurement segment in which the distance from the radar device to a target is measured.

The radar device according to a fourth disclosure is the radar device of the third disclosure, further provided with a transmission control circuitry which, in operation, periodically switches between the interference measurement segment and the distance measurement segment.

The radar device according to a fifth disclosure is the radar device of the first disclosure, further provided with interference determination circuitry that compares the detected each of the one or more interference signal components with a prescribed determination level in the interference measurement segment, determines that one or more interference components are not present when each of the one or more interference signal components is equal to or less than the determination level, and determines that the one or more interference components are present when any of the one or more interference signal components exceed the determination level.

The radar device according to a sixth disclosure is the radar device of the fifth disclosure, further provided with an interference countermeasure control circuitry which, in operation, based on the interference determination result detected in the interference measurement segment, performs interference countermeasure control in the subsequent distance measurement segment.

The radar device according to a seventh disclosure is the radar device of the sixth disclosure, in which the interference countermeasure control circuitry changes a carrier frequency of the radar device.

The radar device according to an eighth disclosure is the radar device of the sixth disclosure, in which the interference countermeasure control circuitry changes the directivity of an antenna of the radar device for a prescribed time interval.

The radar device according to a ninth disclosure is the radar device of the sixth disclosure, in which the interference countermeasure control circuitry increases a code length of the one or more radar transmission signals in the distance measurement segment for a prescribed time interval.

The radar device according to a tenth disclosure is the radar device of the first disclosure, in which the prescribed coefficient sequence includes a coefficient sequence {1, −j, −1, j} (in which j is an imaginary unit).

Heretofore, various embodiments have been described with reference to the drawings, but it goes without saying that the present disclosure is not limited to these examples. It is obvious that a person skilled in the art could conceive of various altered examples or modified examples within the categories described in the claims, and naturally it is to be understood that these also belong to the technical scope of the present disclosure.

Furthermore, the constituent elements in the aforementioned embodiments may be arbitrarily combined without deviating from the purpose of the disclosure.

In the aforementioned embodiments, the present disclosure has been described with examples in which hardware is used to configure the present disclosure; however, it is also possible for the present disclosure to be realized also by using software in cooperation with hardware.

Furthermore, each function block used in the description of each of the aforementioned embodiments is typically realized as an LSI, which is an integrated circuit having an input terminal and an output terminal. These may be implemented separately as single chips or may be implemented as a single chip in such a way as to include some or all of the functional blocks. An LSI has been mentioned here, but a function block may be referred to as an IC, a system LSI, a super LSI, or an ultra LSI depending on the difference in the degree of integration.

Furthermore, the circuit integration technique is not limited to an LSI, and a function block may be realized using a dedicated circuit or a general-purpose processor. After an LSI is manufactured, a field-programmable gate array (FPGA) that can be programmed, or a reconfigurable processor with which the connections and settings of circuit cells within an LSI can be reconfigured, may be used.

In addition, if circuit integration technology that replaces LSI appears as a result of another technology that is an advancement in semiconductor technology or is derived therefrom, naturally, the other technology may be used to carry out the integration of function blocks. The application and so forth of biotechnology is also a possibility.

A radar device according to the present disclosure can be applied to a moving body including a vehicle.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A radar device, comprising:
a receiver which, in operation, receives one or more radar transmission signals transmitted from another radar device, in an interference measurement segment, the interference measurement segment being a segment of time in which transmission of all transmission signals from the radar device is stopped;
A/D conversion circuitry which, in operation, converts the one or more radar transmission signals from the other radar device received by the receiver from one or more analog signals into one or more digital signals;
interference detection circuitry which, in operation, performs a correlation calculation between each of one or more discrete samples that is the one or more digital signals and a prescribed coefficient sequence to detect one or more prescribed frequency components included in the one or more digital signals, as one or more interference signal components;
interference determination circuitry which, in operation, compares each of the detected one or more interference signal components with a prescribed determination level in the interference measurement segment in which transmission of all transmission signals from the radar device is stopped, determines that one or more interference components are not present when each of the one or more interference signal components is equal to or less than the prescribed determination level, and determines that the one or more interference components are present when any of the one or more interference signal components exceeds the prescribed determination level; and
respective-angle interference component detection circuitry which, in operation, when the interference determination circuitry has determined that the one or more interference components are present, performs direction estimation based on phase differences between reception antennas and calculates an interference component for each of a plurality of beam angles, in the interference measurement segment in which transmission of all transmission signals from the radar device is stopped.

2. The radar device according to claim 1, further comprising:
a direction estimation circuitry which, in operation, sets a detection determination threshold value for each of the plurality of beam angles based on the interference component for each of the plurality of beam angles.

3. The radar device according to claim 1, wherein the respective-angle interference component detection circuitry, when the interference determination circuitry has determined that the one or more interference components are not present, determines that the interference component for each of the plurality of beam angles is zero.

4. The radar device according to claim 1, wherein the interference determination circuitry performs the correlation calculation in a same way in the interference measurement segment as in a distance measurement segment in which a distance from the radar device to a target is measured.

5. The radar device according to claim 1, further comprising:
a transmitter which, in operation, stops the transmission of each of the radar transmission signals in the interference measurement segment, and transmits one or more radar transmission signals in a distance measurement segment, the distance measurement segment being a segment of time in which a distance from the radar device to a target is measured.

6. The radar device according to claim 5, further comprising:
transmission control circuitry which, in operation, periodically switches between the interference measurement segment and the distance measurement segment.

7. A radar device, comprising:
a receiver which, in operation, receives one or more radar transmission signals transmitted from another radar device, in an interference measurement segment, the interference measurement segment being a segment of time in which transmission of one or more radar transmission signals from the radar device is stopped;

A/D conversion circuitry which, in operation, converts the one or more radar transmission signals from the other radar device received by the receiver from one or more analog signals into one or more digital signals;

correlation calculation circuitry which, in operation, performs a correlation calculation between each of one or more discrete samples that is the one or more digital signals and a prescribed coefficient sequence;

integration circuitry which, in operation, performs addition processing on output from the correlation calculation circuitry; and respective-angle interference component detection circuitry which, in operation, based on output from the integration circuitry, performs direction estimation based on phase differences between reception antennas and calculates an interference component for each of a plurality of beam angles, in the interference measurement segment in which transmission of all transmission signals from the radar device is stopped.

8. The radar device according to claim 7, further comprising:

a direction estimation circuitry which, in operation, sets a detection determination threshold value for each of the plurality of beam angles based on the interference component for each of the plurality of beam angles, and outputs, when an arrival direction estimation value calculated is greater than the detection determination threshold value set for each of the plurality of beam angles, the arrival direction estimation value calculated as a signal from a target.

* * * * *